United States Patent Office 3,473,556
Patented Oct. 21, 1969

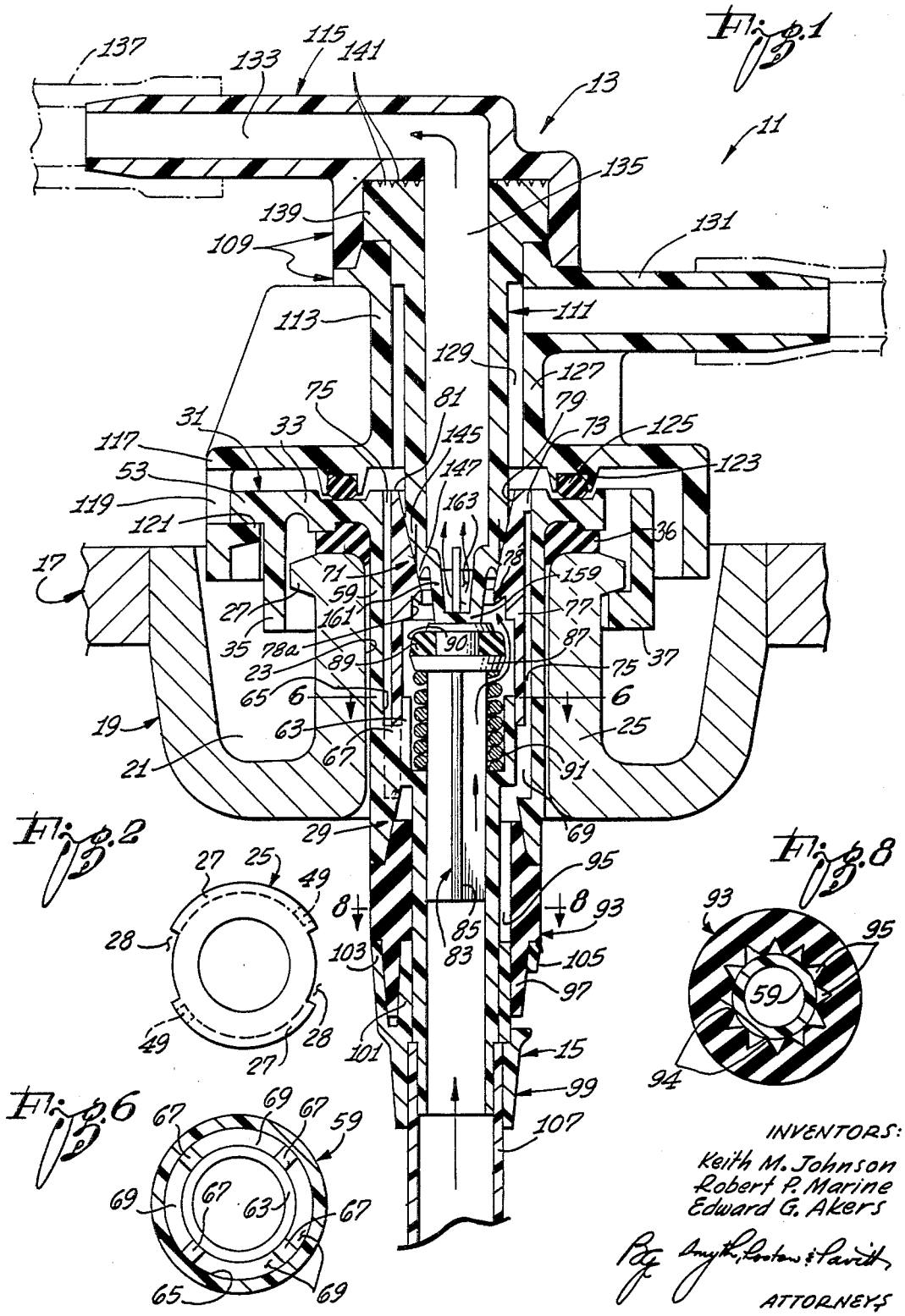

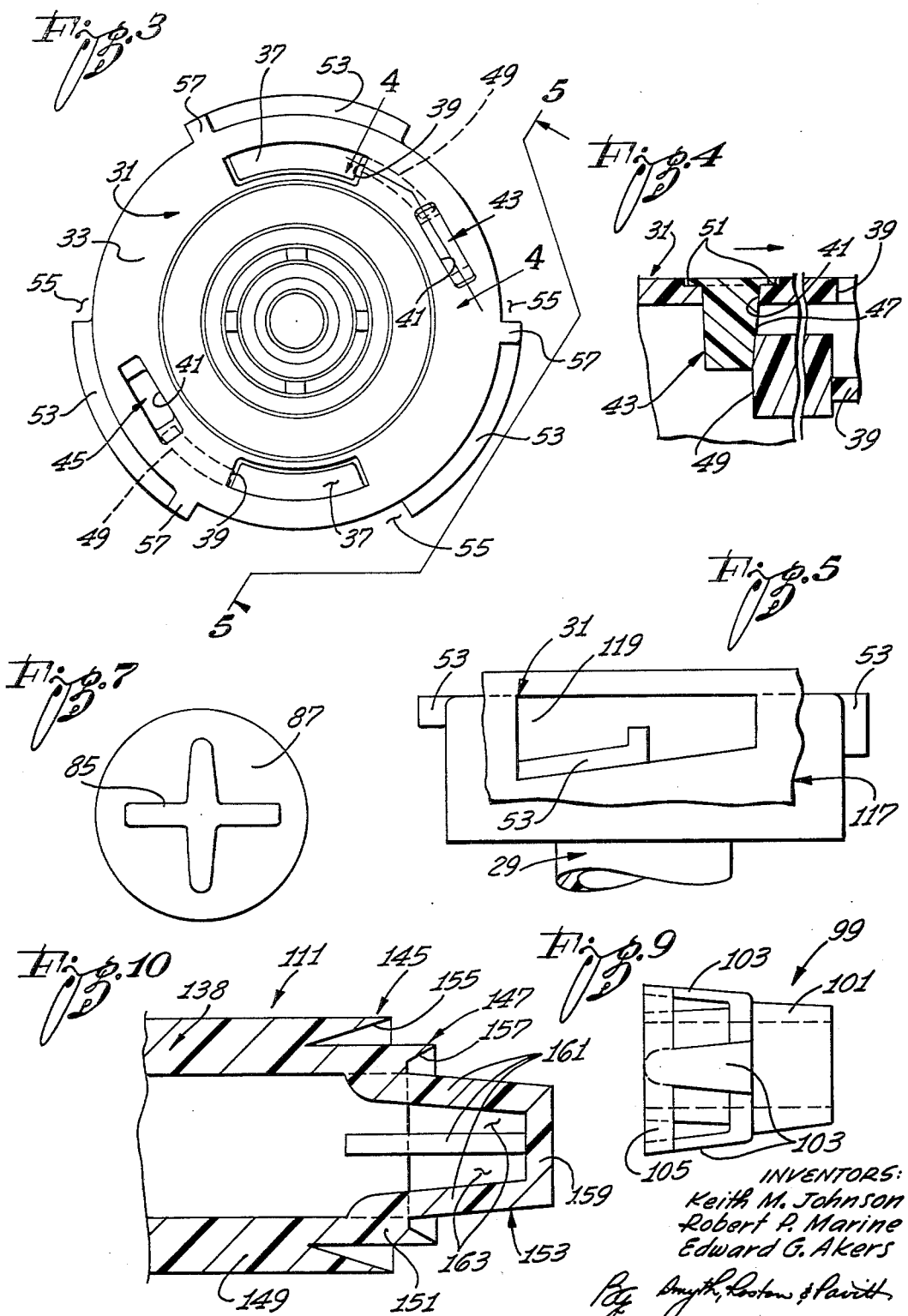

3,473,556
BEER KEG TAPPING DEVICE AND SEAL
Keith M. Johnson, South Laguna, Robert P. Marine, Fullerton, and Edward G. Akers, Downey, Calif., assignors, by direct and mesne assignments, to Polytop Corporation, Slatersville, R.I.
Filed Apr. 3, 1967, Ser. No. 627,865
Int. Cl. B67d 3/04; F16k 41/00; F16l 37/00
U.S. Cl. 137—322                                    7 Claims

ABSTRACT OF THE DISCLOSURE

The disclosure herein describes a novel seal and more particularly a new beer keg tapping device. The beer keg tapping device described herein includes a tapping valve and an outer fitting with the tapping valve having a beer passageway extending therethrough. The passageway has an outwardly flared portion adjacent the outlet thereof. The tapping valve is releasably secured to the beer keg and a valve element is movable axially within the beer passageway to selectively open and close the beer passageway. The outer fitting includes an elongated probe receivable within the outwardly flared portion of the passageway and engageable with the valve element to move the valve element to open the beer passageway. The probe has a beer passageway therein and a skirt-type seal adjacent the inner end of the probe. The seal is engageable with the outwardly flared portion of the beer passageway of the tapping valve and as the probe is moved axially, the skirt seal is cammed radially inwardly to form a very tight probe-to-tapping valve seal before the beer passageway is opened. The tapping valve is secured to the beer keg by cooperating lug members on both of the keg and the outer fitting and by a pair of tabs driven through apertures in the tapping valve and engageable with projections or ribs on the keg.

BACKGROUND OF THE INVENTION

For many years it has been conventional practice to tap pressurized beer kegs with an elongated rod which is driven through a sealed opening in the keg. The rod required some skill to manipulate and the entire procedure was quite dangerous in that the pressure within the keg not infrequently propelled the rod out of the keg at dangerously high velocities. When the rod was not in use, it often became dirty and, when the rod was in use within the keg, it was in contact with the beer. Accordingly, the rod tapping procedure was generally considered quite unsanitary.

More recently however beer kegs have been provided with tapping valves secured thereto. The tapping valve typically includes a beer passageway and a valve element movable within the passageway to selectively open and close the beer passageway. Usually, the beer passageway is opened by depressing the valve element.

An outer fitting which is releasably mounted on the tapping valve is also provided. The outer fitting includes a probe engageable with the valve element to depress the valve element and open the beer passageway when the outer fitting is mounted on the tapping valve. The keg can be provided with pressure from a suitable $CO_2$ container through the outer fitting and the tapping valve to cause beer to flow through the beer passageway on demand.

It is important that the tapping valve and the outer fitting be held in fluid-tight engagement when the beer passageway is open. If a fluid-tight seal is not formed, pressure in the keg will be lost and the beer will become flat and unmarketable. Accordingly, it is common practice to provide a seal between the tapping valve and the outer fitting.

One problem with prior art seals of this type is that the seal formed is often inadequate and this results in depressurization or loss of beer. Another problem is that the seal on the outer fitting and the seat on the tapping valve against which the seal abuts become misaligned, due to carelessness of the operator or otherwise, when the keg is being tapped. As the seal is hidden, the operator cannot tell whether or not the seal and other portions of the tapping valve and outer fitting are properly aligned. Misalignment of this type renders the seal ineffective.

Some prior art seals are objectionable because they unduly restrict the internal diameter of the passageway. An O-ring seal is undesirable because it tends to form a bacteria trap. Another problem is that the seal does not become fluid-tight until after the valve element is depressed and the beer passageway is open.

Usually, the outer fitting is mounted on the tapping valve by pivoting or rotating the outer fitting relative to the tapping valve. This rotation occurs after the seal is or should be firmly seated on the seat provided therefor. It is important therefore, that the seal does not provide substantial frictional resistance to the relative rotation necessary to mount the outer fitting on the tapping valve. Such high frictional resistance makes tapping of the keg more difficult and also may cause considerable wear on the seals which would shorten the useful life thereof.

The tapping valve, which is secured to the beer keg must occasionally be removed for cleaning or repair such as welding of the keg. Prior art tapping valves are oftentimes threaded into an opening provided therefor in the beer keg, or secured to the keg by fastening means, which are otherwise difficult or impossible to unfasten. This results in substantially lengthening the time required for cleaning or repairing.

SUMMARY OF THE INVENTION

The present invention provides an improved seal between two members movable axially relative to each other and more particularly a beer keg tapping device in which the seal between the tapping valve and the outer fitting is substantially improved. With the present invention the problems in respect of misalignment of the tapping valve and the outer fitting are eliminated in that the outer fitting of this invention and the tapping valve are self-aligning. The outer fitting is secured to the tapping valve by relatively rotating the outer fitting and the seal of this invention offers very low frictional resistance to such rotation. As the frictional resistance to rotation is low, the wear on the seal is correspondingly reduced.

The present invention is applicable to beer keg tapping devices of the type which include a tapping valve and an outer fitting. The tapping valve is secured to the beer keg and comprises a valve body having a passageway extending therethrough and a valve element movable in said passageway to selectively open and close the passageway. The outer fitting is securable to the tapping valve and includes a probe having a beer passageway therethrough engageable with the valve element to open the beer passageway in the tapping valve when the outer fitting is connected to the tapping valve.

The present invention provides a self-aligning feature to assure a better seal between the outer fitting and the tapping valve even though the operator is careless in tapping the keg. The present invention teaches flaring the outlet section of the beer passageway in the tapping valve radially outwardly so that the flared portion can guide the inner end of the probe into the beer passageway in the tapping valve and into engagement with the valve element to open the beer passageway in the tapping valve. Preferably the flared portion is frustoconical and the probe is elongated and at least slightly flexible. This allows the flared portion to easily bring the probe into proper alignment.

Another concept of the present invention is to provide a flexible resilient seal depending from the probe and cooperable with the flared portion of the beer passageway in the tapping valve to form a fluid-tight seal between the tapping valve and the probe. The seal is preferably in a form of a flexible resilient generally annular lip depending from a main body section of the probe and having an inner surface spaced radially outwardly from the main body section of the probe. In tapping the keg, the flexible resilient seal contacts the flared portion of the beer passageway and is cammed radially inwardly and tightly against the flared portion of the passageway as the probe continues moving axially inwardly. After a tight seal is formed between the seal and the flared portion of the passageway, continued axial movement of the probe is operative to move the valve element and open the beer passageway. With the beer passageway open, beer under pressure acts on the inner surface of the annular seal to urge the latter radially outwardly into even tighter sealing relationship with the flared portion of the passageway. It is apparent that the seal of this invention is not limited in its use to beer keg tapping devices, but rather has utility generally in forming a seal between two members movable axially relative to each other.

To simplify construction and to maintain maximum internal diameter of the beer passageway and the probe, it is preferred to construct the seal integral with an inner end portion of the probe. For optimum sealing effectiveness, two of the seals should be provided in axially spaced relationship. To reduce frictional resistance to relative rotation between the seal and the flared portion of the beer passageway, it is preferred to construct these elements of a plastic material such as linear polyethylene which is somewhat waxy.

It is common practice for the valve element which opens and closes the beer passageway to carry a seal which is often in the form of a resilient O-ring. This O-ring seal is engageable with a valve seat which substantially radially expands the latter to seal the beer passageway. This substantial expansion of the O-ring produces a significant problem in beer keg tapping devices in that the seal often times does not recover, i.e. return to its normal unstressed condition, when the valve element has been moved to open the beer passageway. As the beer passageway must, of necessity, be of small diameter to fit within the standard keg opening, failure of the O-ring to recover tends to cause the O-ring to block or substantially restrict the beer passageway. The present invention solves this problem by substantially completely confining the seal against radial expansion when the seal engages the valve seat. Thus, even if the seal of the present invention does not completely recover, there is no danger that the beer passageway will be blocked or substantially restricted once the valve element has been moved to the open position.

Another feature of the present invention is providing for easy removal of the tapping valve from the keg. In this connection, the keg may be provided with a boss surrounding an opening in the keg and a lug extending outwardly from the boss. The outer fitting includes a collar section carrying a cooperating lug. The collar section can be rotated to a position in which the lug thereon lies beneath the lug on the boss to prevent the tapping valve from being pulled axially out of the keg. The collar section has a pair of apertures therein in which wedges or tabs are received. The wedges engage ribs or projections on the boss to prevent rotation of the tapping valve to a position in which the lug thereof is spaced circumferentially from the lug on the boss. The primary advantage of this construction is that it is easy to secure the tapping valve to the keg and also the tapping valve can be removed by merely driving the wedges completely through the aperture in the collar section so that the tapping valve is no longer held against rotation. The tapping valve may then be rotated so that the lugs thereof are spaced circumferentially from the lugs of the boss to allow the tapping valve to be removed from the keg.

BRIEF DESCRIPTION OF THE DRAWINGS

FIG. 1 is a longitudinal sectional view through a beer keg tapping device constructed in accordance with the teachings of this invention.

FIG. 2 is a top plan view of reduced size showing the boss on the keg.

FIG. 3 is a top plan view of the tapping valve.

FIG. 4 is a fragmentary sectional view taken along line 4—4 of FIG. 3 and showing one of the wedges for preventing relative rotation between the tapping valve and the beer keg.

FIG. 5 is a fragmentary elevational view taken along line 5—5 of FIG. 3 with a fragment of the outer fitting being shown to illustrate how the outer fitting is mounted on the tapping valve.

FIG. 6 is a sectional view taken along line 6—6 of FIG. 1 showing details of the valve body with the valve member and insert removed.

FIG. 7 is a bottom plan view of the valve element.

FIG. 8 is a sectional view taken along line 8—8 of FIG. 1.

FIG. 9 is a side elevational view of a cage used for retaining a check valve of the device.

FIG. 10 is an enlarged fragmentary sectional view through the inner portion of the probe and of the seals with the seals being shown in the normal or unrestrained position thereof.

DESCRIPTION OF THE PREFERRED EMBODIMENT

Referring to the drawings and in particular to FIG. 1 thereof reference numeral 11 designates a beer keg tapping device constructed in accordance with the teachings of this invention. The beer keg tapping device 11 generally includes an outer fitting 13 and an inner fitting or tapping valve 15 which is mounted on a keg 17 of beer or other pressurized fluid. Most of the parts of the outer fitting 13 and the tapping valve 15 can be advantageously constructed of stainless steel or a suitable plastic material.

The keg 17 includes a dished plug 19 defining an outwardly opening annular well 21. The plug 19 has an opening 23 therein which defines an opening which provides access to the interior of the keg 17. The plug 19 has a cylindrical boss 25 ((FIGS. 1 and 2) integral therewith and surrounding the opening 23. The boss 25 has a pair of radially extending lugs 27 which are spaced circumferentially a predetermined distance from each other to provide a pair of opposed slots 28.

The tapping valve 15 includes a valve body or stem section 29 and a collar or attachment section 31 (FIGS. 1 and 3). The attachment section 31 has a radially extending annular web 33 and a generally cylindrical flange 35 depending from the web 33. An annular seal 36 is interposed between the web 33 and the boss 25. A pair of diametrically opposed lugs 37 extend radially inwardly from the lower edge of the flange 35 and are adapted to fit beneath the lugs 27 and the keg 17 to secure the tapping valve 15 to the keg.

As shown in FIG. 3, the web 33 has a pair of opposed arcuate slots 39 through which the lugs 37 are visible. The web 33 also includes a pair of diametrically opposed apertures 41.

In mounting the tapping valve 15 on the keg 17, the valve body 29 is inserted into the opening 23 with the lugs 37 aligned with the slots 28 (FIG. 2) in the boss 25. The tapping valve 15 is then moved axially inwardly in the opening 23 until the lugs 37 are lower than the lugs 27 at which time the tapping valve 15 is rotated to bring the lugs 37 beneath the lugs 27. The amount of rotation is small and may be about 100°. Thus, the lugs 27 and 37 cooperate to prevent axial withdrawal of the tapping valve 15 from the keg 17. The circumferential extent of the lugs 27 and 37 and the slots 28 can be varied as desired.

In order to positively prevent removal of the tapping valve 15 from the keg 17, it is necessary that the tapping valve and the keg be prevented from rotating relative to each other to maintain the lugs 37 beneath the lugs 27. According to the present invention, such relative rotation is prevented by a pair of tabs or wedges 43 and 45 which are driven into the apertures 41 of the attachment section 31 and by the lugs 37. As shown in FIG. 4, the wedge 43 has a longitudinal edge 47 which is engageable with a rib or projection 49 formed on the outer surface of the boss 25. Thus, the wedge 43 and the rib 49 prevent relative rotation between the tapping valve 15 and the keg 17 in the direction indicated by the arrows in FIG. 4. Similarly, the lug 37 engages the rib 49 to prevent relative rotation between the tapping valve 15 and the keg 17 in the opposite direction. In some instances the rib 49 will be spaced from the lug 37 and the wedge 43 to allow slight movement of the tapping valve 15.

The wedges 43 and 45 are preferable tapered only slightly so that they are "sticking wedges" in the sense that they will be tightly held within the apertures 41. The wedges 43 and 45 are constructed of a plastic material and each of these wedges has a pair of frangible ears 51 extending laterally thereof as shown in FIG. 4. In mounting the tapping valve 15 on the keg 17, the wedges 43 and 45 are driven into their respective apertures 41 until the frangible ears 51 seat on the attachment section 31 as shown in FIG. 4. To detach the tapping valve 15 from the keg 17, it is only necessary to drive the wedges 43 and 45 completely through their respective apertures 41 thereby breaking the frangible ears 51. This allows the tapping valve 15 to be turned to align the lugs 37 thereof with the slots 28 of the keg 17 to thereby allow removal of the tapping valve 15 from the keg 17.

Three outer fitting attachment flanges 53 are formed integrally with the attachment section 31 as shown in FIGS. 3 and 5. The attachment flanges 53 are spaced circumferentially to define peripheral gaps 55 therebetween. As shown in FIG. 5, each of the flanges 53 is inclined downwardly for the purpose of camming the outer fitting 13 axially inwardly as it is being secured to the tapping valve 15.

The valve body 29 includes a generally tubular member 59 which is of larger outside diameter adjacent the outer end thereof than adjacent its inner end. The member 59 has an integral cylindrical wall 63 (FIGS. 1 and 6) spaced radially inwardly of an interior surface 65 thereof. The cylindrical wall 63 is interconnected to the interior surface 65 by four radially extending webs 67 (only one being shown in FIG. 1). The webs 67 are spaced circumferentially to define four slots 69 (only one being shown in FIG. 1).

A tubular generally cylindrical insert 71 is inserted into the tubular member 59 with the inner end of the insert 71 snugly surrounding the cylindrical wall 63 to releasably retain the insert 71 within the tubular member 59. The upper or outer end of the insert 71 is spaced from the interior surface 65 of the tubular member 59 by four small ribs 73 (only one being shown in FIG. 1) with the ribs 73 being spaced substantially circumferentially to provide a substantially uninterrupted annular passage 75 communicating with the slots 69.

The insert 71, which is preferably constructed of a plastic material such as polycarbonate or stainless steel, provides an annular shoulder or valve seat 77. The valve seat 77 has an annular shoulder or end wall 78 which projects downwardly as it extends radially inwardly. The valve seat 77 also has a lateral peripheral frustoconical surface 78a which flares outwardly as it extends downwardly from the shoulder 78. Outwardly of the valve seat 77, the insert 71 provides an interior frustoconical surface or flared portion 79 which extends radially outwardly as it extends axially toward an outlet or upper end 81 of the valve body. The surface 79 preferably tapers gradually and may taper at an angle of the order of 12° as viewed in radial cross-section. As shown in FIG. 1, the frustoconical surface 79 is axially elongated.

A valve element 83 is slidably mounted in the tubular member 59. The valve element 83 includes an elongated stem 85 of X-shaped cross-section as shown in FIG. 7 and a head portion 87. The head portion 87 carries an annular resilient seal 89 which is engageable with the valve seat 77 and which forms a trapezoid in radial cross-section, one included angle of which is preferably about 90° as shown. The seal 89 is mounted axially on the valve element 83 and the head portion 87 forms a retainer for retaining the seal. As shown in FIG. 1, the head portion 87 grips or embraces an inner annular portion of the seal 89 and supports substantially all of the face of the seal which is remote from the valve seat 77. Thus, only a small portion of the exterior surface of the seal 89 is exposed. The seal 89 has a frustoconical peripheral surface 90 which is sized to be received within the frustoconical lateral peripheral surface 78a of the valve seat 77 and is correspondingly tapered. The surfaces 78a and 90 may taper inwardly at angles of about 5° each as they extend toward the valve seat 77. A coil spring 91 normally urges the seal 89 into engagement with the valve seat 77. With the seal 89 engaging the valve seat 77, the beer passageway through the tubular member 29 is closed. However, with the valve element 83 depressed or out of engagement with the valve seat 77 as shown in FIG. 1 beer flows through the beer passageway in the tubular member 59 as indicated by the arrows.

More particularly as the spring 91 urges the seal 89 into engagement with the valve seat 77, the shoulder 78 will engage a portion of the exposed surface of the seal 89 to urge the resilient seal radially outwardly into fluid-tight sealing engagement with the lateral peripheral surface 78a of the valve seat 77. The axial extent of the lateral peripheral surface 78a of the valve seat 77 is substantially equal to the axial extent of the peripheral surface 90 of the seal 89 so that when the seal is held tightly against the valve seat 77 it is substantially completely surrounded by the valve seat 77 and the head portion 87 of the valve 83. Accordingly, although the forces acting on this seal 89 are substantial, the seal can expand only as permitted by the surface 78a and thus is substantially confined against radial expansion. As the shoulder 78 extends both axially and radially, it serves as a projection which urges the resilient seal 89 radially outwardly into fluid-tight engagement with the lateral peripheral surface of the valve seat 77.

An annular check valve 93 of flexible resilient material such as rubber snugly fits over the outer surface of the inner or lower section of the tubular member 59 as shown in FIG. 1. The inner surface of the check valve 93 is provided with a plurality of ribs 94 (FIG. 8) which define a plurality of axial grooves. These grooves together with the outer surface of the tubular member 59 define a plurality of elongated circumferentially spaced axially extending passageways 95 (one of which is shown in FIG. 1) which communicate with the slots 69 and the annular passage 75. The check valve 93 has an inner annular end portion 97 of reduced wall thickness to render the annular end 97 more flexible. As shown in FIG. 1, the passageways 95 extend axially from the upper end of the check valve 93 to the upper end of the annular end portion 97.

A cage 99 preferably of plastic material or stainless steel snugly fits over an inner end portion of the tubular member 59 as shown in FIG. 1. As shown in FIG. 9, the cage 99 includes a generally cylindrical body section 101 which snugly receives the tubular member 59, four prongs 103 integral with and tapering away from the body section 101 and a peripheral web 105 interconnecting the outer ends of the prongs 103. As shown in FIG. 1, the annular end in 97 of the check valve 93 is tightly received in the space between the prongs 103 and the body section 101.

It is necessary that a suitable pressurized fluid such as $CO_2$ be supplied to the interior of the keg to pressurize the contents thereof. The tapping valve 15 provides a $CO_2$ passageway which is defined by the annular passage 75, the slots 69, and the passageway 95. The annular end 97 of the check valve 93 is sufficiently flexible so that the $CO_2$ under pressure can cause the portions thereof intermediate adjacent prongs 103 to flex outwardly to provide communication between the passageways 95 and the interior of the keg. The check valve 93 prevents backflow in that the pressure within the keg, when little or no $CO_2$ pressure is applied from the $CO_2$ passageway, urges the flexible annular end portion 97 tightly into engagement with the body section 101 of the cage 99.

The inner end portions of the body section 101 and the tubular member 59 are spaced radially to snugly receive a tube 107 which may extend to the bottom of the keg 17 to supply the beer or other fluid within the keg to the tapping valve 15.

The outer fitting 13 generally includes a bar nut 109 and an elongated probe 111. The bar nut 109 includes a body section 113, a cap 115 secured to the body section 113 and an attachment section 117 partially surrounding the attachment section 31 of the tapping valve 15. The attachment section 117 has three slots 119 (FIGS. 1 and 5) each of which has a ledge 121 extending radially inwardly thereof (only one being shown in FIG. 1). The ledges 121 are sized and spaced to extend through the gaps 55 (FIG. 3) intermediate the attachment flanges 53 of the tapping valve 15 to allow the ledges 121 to be at a lower elevation than the flanges 53 whereupon the outer fitting 13 is rotated to move the ledges 121 beneath the adjacent flanges 53. One or both of the ledges 121 and the flanges 53 may be inclined to draw the outer fitting 13 axially inwardly as it is being rotated. The outer fitting 13 may be rotated to the position shown in FIG. 5 at which point the outer fitting is properly mounted on the tapping valve 15. The amount of rotation required is about 10° to 45°.

The attachment section 117 has an annular seal retainer 123 for carrying an annular seal 125 which is engageable with the upper surface of the tapping valve 15. The body section 113 includes a hollow cylindrical section 127 which is spaced radially outwardly of the outer surface of the probe 111 to define an annular passage 129. The annular passage 129 communicates with a fitting 131 which is connectable to a supply of $CO_2$ or other suitable fluid under pressure. Thus, the bar nut 109 provides a $CO_2$ passageway which includes the fitting 131 and the annular passage 129 which communicates with the annular passage 75 in the tapping valve 15.

The cap 115 is preferably constructed of stainless steel or a suitable plastic material such as polycarbonate and is secured to the body section 113. The cap 115 and the probe 111 define communicating passages 133 and 135, respectively, which together form a beer passageway through the outer fitting 113. The cap 115 may be suitably connected to a conduit 137 which may lead, for example, to a conventional bar tap.

The probe 111 is preferably constructed from linear polyethylene although other materials such as polypropylene and nylon may be used. The probe 111 is generally cylindrical and has a main body section, a radially enlarged section 139 at the upper end thereof which is sandwiched between the body section 113 and the cap 115 as shown in FIG. 1. A plurality of concentric circular ribs 141 are formed on the upper surface of the enlarged section 139 and sealingly engage the cap 115 to provide a fluid-tight seal between the cap and the probe.

The probe extends axially inwardly toward the tapping valve 15 in radially spaced relationship to the cylindrical section 127. A double seal is formed integrally with the inner end portion of the probe 111. The double seal includes an outer annular flexible resilient seal 145 (FIGS. 1 and 10) and an inner annular flexible seal 147 spaced axially from the seal 145. The seal 145 has a larger axial dimension than the seal 147 and the latter offers greater resistance to radial inward flexing than does the former. Both of the seals 145 and 147 are triangular in radial cross-section, and more particularly form a right triangle in radial cross-section when the seals are unrestrained. As best seen in FIG. 10, the main body section 138 has sections 149, 151 and 153 of progressively decreasing cross-sectional area. The seal 145 depends from the section 149 at the juncture thereof with the section 151, and the seal 147 depends from the intermediate section 151 at the juncture thereof with the section 153. Each of the seals 145 and 147 have inner surfaces 155 and 157, respectively, and cylindrical outer peripheries. Each of the inner surfaces 155 and 157 is spaced from, and forms an acute angle with the adjacent surface of the main body section 138. For example, the surface 155 may form an angle in radial cross-section of about 15° with the outer surfaces of sections 149 and 151 and surface 157 may form an angle of about 30° with the outer surface of section 151. The seal 145 has a larger diameter than seal 147.

The inner section 153 includes a transverse end wall 159 and four fingers 161 three being shown in FIG. 10) which taper radially outwardly as they extend axially from the transverse end wall to the section 151. The fingers 161 are spaced circumferentially to form four openings 163 (two being shown in FIG. 10).

The keg 17 will normally be supplied to the consumer with the tapping valve 15 installed thereon in the manner described hereinabove. To tap the keg 17, the outer fitting 13 is urged downwardly toward the tapping valve 15 so that the probe 111 will enter the frustoconical section 79 and as the probe is moved downwardly further, the frustoconical surface 79 will guide the end wall 159 toward the valve element 83. The elongated probe 111 is somewhat flexible so that any misalignment between the probe and the frustoconical section 79 due to operator error or production tolerances or otherwise, is easily corrected by the frustoconical surface 79 and some slight flexing of the probe 111. The taper of the fingers 161 also assists in aligning the probe with the tapping valve 15.

The seals 145 and 147 and the frustoconical surface 79 engage before the transverse end wall 159 engages the valve element 83. As the probe 111 is pushed further into the tapping valve 15, the frustoconical surface 79 cams the seals 145 and 147 radially inwardly as is permitted by the spaces between the inner surfaces 155 and 157 and the main body section 138. Such radial inward movement of the seals 145 and 147 is resisted by the resiliency of the seals to thereby provide a fluid-tight seal between the probe 111 and the frustoconical section 79.

After the seal is formed, the transverse end wall 159 of the probe 111 engages the valve element 83 so that further axial inward movement of the probe 111 depresses the valve element 83 to the position shown in FIG. 1. Such additional axial inward movement of the probe 111 cams the seals 145 and 147 inwardly an additional amount and forms a tighter seal between the probe 111 and the frustoconical surface 79. With the valve element 83 depressed as shown in FIG. 1, the valve element is separated from the valve seat 79 to open the beer passageway in the tapping valve 15. Beer may then flow through the passageway in the tubular member 59, around the stem 85 of the valve element 83, around the seal 89, through the openings 163 in the probe 111, and through the passageway 135 in the probe to the passageway 133 of the cap 115. Assuming that the conduit 137 has been secured to a conventional bar tap, the keg 17 will now be capable of supplying beer to that tap. Of course, $CO_2$ can be supplied to the interior of the keg from the fitting 131 through the annular passage 129, the annular passage 75, the slots 69, and the axial passages 95 to the flexible annular end portion 97 of the check valve 93. The $CO_2$ under pressure in the passages 95 can then force the flexible annular end portion 97 radially outwardly as permitted by the cage 99 to supply $CO_2$ to the interior of the keg 17.

Once the fitting 13 is moved the appropriate distance axially inwardly, the operator promptly rotates the outer fitting 13 through a predetermined short arc to cause the ledges 121 thereof to be moved beneath the attachment flanges 53 of the tapping valve 15, as shown in FIGS. 1 and 5. Although the seals 145 and 147 tightly engage the frustoconical section 79 during the rotational movement of the outer fitting 13, such tight engagement offers little frictional resistance to the rotational movement of the outer fitting 13. This is made possible by constructing the probe 111 of a waxy plastic material such as linear polyethylene which easily slides over the frustoconical surface 79. With the valve element open, beer under pressure acts on the inner surface 157 of the seal 147 and may also act on the inner surface 155 of the seal 145 to urge the seals radially outwardly with greater force. The seals 145 and 147 recover, i.e. regain their original shape when removed from the frustoconical surface 79 so that multiple usage of the probe 111 is possible.

Although an exemplary embodiment of the invention has been shown and described, many changes, modifications, and substitutions may be made by one having ordinary skill in the art without necessarily departing from the spirit and scope of this invention.

What is claimed is:

1. In a beer keg having an opening therein, the combination of:
   a boss on said beer keg surrounding said opening and having at least one connecting lug extending generally radially outwardly thereof;
   a tapping valve including a stem section receivable in said opening, said stem section having a beer passageway therein and including a valve element movable in said beer passageway to selectively open and close the beer passageway;
   said tapping valve including a collar section secured to said stem section, said collar section having a cooperating lug receivable beneath said connecting lug to prevent relative axial movement between said collar section and said boss, said collar section having a generally axially extending aperture therein;
   a first tab receivable in said aperture in said collar section and extendible generally axially along said boss; and
   means on said boss engageable with said tab to prevent relative rotation between said collar section and said boss whereby said cooperating lug remains beneath said connecting lug to firmly retain the tapping valve one the beer keg.

2. A combination as defined in claim 1 wherein said tab has a frangible finger extending laterally thereof to engage the collar section to prevent said tab from initially being driven completely through said aperture in said collar section whereby said finger can be broken to allow said tab to be driven completely through said aperture in said collar section to allow removal of said tapping valve from said beer keg.

3. A combination as defined in claim 1 wherein said collar section contains a second aperture and a second tab is receivable within said aperture and said last mentioned means includes first and second projections on said boss engageable with said first and second tabs respectively, to prevent rotation of said attachment section relative to said boss.

4. In a device for tapping a beer keg, the combination of:
   an inner fitting connectible to the keg and including an interior surface defining a beer passageway terminating in an outlet and a valve member movable within said beer passageway to selectively open and close said beer passageway, respectively, the interior surface having an outwardly flared portion adjacent the outlet of the beer passageway;
   a probe having a beer passageway therein, an inner end, an outer end, and a main body section with an outer surface;
   said probe defining a flexible resilient seal integral with said main body section adjacent the inner end thereof, said seal in radial cross-section having an inner surface normally spaced radially over at least a portion of its length from the outer surface of said main body section;
   said seal being movable generally axially in the outwardly flared portion of the beer passageway of the inner fitting to cause said outwardly flared portion to cam the flexible resilient seal radially inwardly and to move the inner surface of said seal toward the outer surface of said main body section to form a fluid-tight seal between said probe and said inner fitting;
   means for moving the valve element to open the beer passageway in the inner fitting after said fluid-tight seal is formed; and
   said main body section including a first portion of reduced cross-sectional area and a second portion of increased cross-sectional area joined thereto, said seal depending from said second portion at the juncture of said first and second portions of said main body section.

5. In a device for tapping a beer keg, the combination of:
   an inner fitting connectible to the keg and including an interior surface defining a beer passageway terminating in an outlet and a valve member movable within said beer passageway to selectively open and close said beer passageway, respectively, the interior surface having an outwardly flared portion adjacent the outlet of the beer passageway;
   a probe having a beer passageway therein, an inner end, an outer end, and a main body section with an outer surface;
   said probe defining a flexible resilient seal integral with said main body section adjacent the inner end thereof, said seal in radial cross-section having an inner surface normally spaced radially over at least a portion of its length from the outer surface of said main body section;
   said seal being movable generally axially in the outwardly flared portion of the beer passageway of the inner fitting to cause said outwardly flared portion to cam the flexible resilient seal radially inwardly and to move the inner surface of said seal toward the outer surface of said main body section to form a fluid-tight seal between said probe and said inner fitting;
   means for moving the valve element to open the beer passageway in the inner fitting after said fluid-tight seal is formed;
   said main body section including in sequence first, second and third portions of reduced, intermediate, and large cross-sectional areas, respectively, said seal depending from said second portion at the juncture of said first and second portions of said main body section; and
   a second seal depending from said third portion of said main body section at the juncture thereof with said second portion and having an inner surface normally spaced radially over at least a portion of its length from the outer surface of said second portion of said main body section.

6. In a device for tapping a beer keg, the combination of:
   an inner fitting connectible to the keg and including an interior surface defining a beer passageway terminating in an outlet and a valve member movable within said beer passageway to selectively open and close said beer passageway, respectively, the interior surface having an outwardly flared portion adjacent the outlet of the beer passageway;

a probe having a beer passageway therein, an inner end, an outer end, and a main body section with an outer surface;

said probe defining a flexible resilient seal integral with said main body section adjacent the inner end thereof, said seal in radial cross-section having an inner surface normally spaced radially over at least a portion of its length from the outer surface of said main body section;

said seal being movable generally axially in the outwardly flared portion of the beer passageway of the inner fitting to cause said outwardly flared portion to cam the flexible resilient seal radially inwardly and to move the inner surface of said seal toward the outer surface of said main body section to form a fluid-tight seal between said probe and said inner fitting;

means for moving the valve element to open the beer passageway in the inner fitting after said fluid-tight seal is formed;

the keg having a boss thereon surrounding an opening in the keg and having at least one connecting lug extending generally radially outwardly thereof;

the inner fitting including a stem section receivable in said opening and having the beer passageway therein, the inner fitting including a collar section secured to said stem section, said collar section having a cooperating lug receivable beneath said connecting lug to prevent relative axial movement between said collar section and said boss, said collar section having a generally axially extending aperture therein;

a first tab receivable in said aperture in said collar section and extendible generally axially along said boss;

means on said boss engageable with said tab to prevent relative rotation between said collar section and said boss whereby said cooperating lug remains beneath said connecting lug to firmly retain the tapping valve on the beer keg; and the beer passageway defining a valve seat and the valve member including a valve member body, an annular resilient seal and retaining means for mounting the seal on the valve member body and for embracing an inner annular region thereof, a portion of said valve seat and the peripheral surface of the seal being correspondingly tapered, said valve seat having an annular shoulder whereby forcing of said seal against said shoulder causes said seal to expand radially into said portion of said valve seat.

7. In a fluid-tight seal for use with two members movable axially relative to each other, the combination of:

a first member having a passageway therethrough, a portion of said passageway being flared radially outwardly;

a second member at least partially receivable in said passageway of said first member, said second member including a main body section and a seal integral with said main body section, said seal including a flexible resilient generally annular lip depending from said main body section and being spaced therefrom to allow said annular lip to be urged radially inwardly, said members being movable generally axially relative to each other to move said annular lip into engagement with the flared portion of said passageway whereby said flared portion flexes said annular lip radially inwardly to form a fluid-tight seal between said members; and said main body section including a first portion of relatively large cross-sectional area joined to a second portion of relatively smaller cross-sectional area, said annular lip depending from said first portion at the juncture thereof with said portion, said annular lip having an inner surface normally spaced from said second portion whereby fluid under pressure can act on the inner surface to urge said annular lip radially outwardly into fluid-tight relation with the flared portion of said passageway.

References Cited

UNITED STATES PATENTS

| 533,708 | 2/1895 | Gates | 285—107 |
| 581,877 | 5/1897 | Beare | 137—322 XR |
| 2,498,831 | 2/1950 | Veitch | 285—260 XR |
| 2,645,449 | 7/1953 | Gulick. | |
| 2,799,292 | 7/1957 | Pearce | 137—516.29 XR |
| 2,881,011 | 4/1959 | Coughlin | 251—149.4 XR |
| 2,932,531 | 4/1960 | Briechle | 285—110 |
| 3,266,822 | 8/1966 | Hinderer | 285—332.1 XR |
| 3,361,152 | 1/1968 | Akers | 137—212 |

FOREIGN PATENTS 884,698  12/1961  Great Britain.

WILLIAM F. O'DEA, Primary Examiner

ROBERT G. NILSON, Assistant Examiner

U.S. Cl. X.R.

137—212, 516.29, 797; 222—400.7; 285—107, 110, 260